United States Patent [19]

Lafferty et al.

[11] 3,949,050
[45] Apr. 6, 1976

[54] METHOD OF ABSORBING UF$_6$ FROM GASEOUS MIXTURES IN ALKAMINE ABSORBENTS

[75] Inventors: Robert H. Lafferty; Seymour H. Smiley, both of Oak Ridge, Tenn.; Kenneth J. Radimer, Little Falls, N.J.

[73] Assignee: The United States of America as represented by the United States Energy Research and Development Administration, Washington, D.C.

[22] Filed: Sept. 20, 1948

[21] Appl. No.: 50,242

[52] U.S. Cl. ................................ 423/11; 423/258
[51] Int. Cl.$^2$ ........................................ C01G 43/06
[58] Field of Search ............... 23/14.5; 423/11, 258

*Primary Examiner*—Benjamin R. Padgett
*Assistant Examiner*—E. A. Miller
*Attorney, Agent, or Firm*—Dean E. Carlson

[57] ABSTRACT

A method of recovering uranium hexafluoride from gaseous mixtures employing as an absorbent a liquid composition at least one of the components of which is chosen from the group consisting of ethanolamine, diethanolamine, and 3-methyl-3-amino-propane-diol-1,2.

10 Claims, No Drawings

METHOD OF ABSORBING UF$_6$ FROM GASEOUS MIXTURES IN ALKAMINE ABSORBENTS

This invention made herein was made in the course of, or under a government (AEC or predecessor) contract.

The present invention relates to a method of recovering uranium hexafluoride from gaseous mixtures, more particularly to absorbing uranium hexafluoride from gaseous mixtures employing a liquid composition as an absorbent.

In recent years considerable attention has been devoted to gas separation processes of the type wherein components of a gaseous mixture are separated by diffusion. Attention has been devoted particularly to the separation of gaseous mixtures containing or comprising the isotopes of uranium. Such diffusion separation processes for the separation of the isotopes of uranium necessarily involve the employment of a gaseous compound of uranium in large quantities. Of the various compounds of uranium which might be used, uranium hexafluoride has been found to be the most practical because it is a vapor at relatively low temperatures (i.e. 65°C. and one atmosphere pressure) and the fluoride component of the compound does not interfere with the separation since it has no naturally occurring isotopes. The absence of isotopes other than the uranium isotopes is important because the diffusion separation process operates to separate the molecules according to their molecular weight, not according to the molecular weight of a single component. Thus, for example, if the compound UCl$_6$ were used, the chlorine isotopes Cl$^{35}$ and Cl$^{37}$ might interfere with, or dominate, the difference in molecular weight due to the uranium isotopes.

One method of separating the isotopes of uranium employing a gaseous mixture of uranium hexafluoride is by passing said mixture against a porous, permeable membrane characterized by exceedingly fine pores. A portion of the gas flowed against said membrane passes through the pores thereof and another portion flows over and past the membrane. The portion passing through the membrane is found to be enriched with respect to U$^{235}$ and that flowing past the membrane is enriched with respect to U$^{238}$. Such membranes have been employed in plants for the diffusive separation of uranium isotopes. Because of the small separation which occurs when a gas is flowed against a membrane surface, the size of the plant and the requisite volume of gas required to operate it is extremely large.

In the operation of a diffusion separation plant foreign gases become admixed with uranium hexafluoride because of accidents, reactions within the cascade, or because of slow inleakages from the atmosphere.

Diffusion plants are usually operated at reduced pressures in order to prevent uranium hexafluoride from condensing on the surfaces within the plant and to increase the mean free path of the molecules in the gas. The maintenance of reduced pressures (usually in the order of one-half atmosphere) results in the accumulation of inert or atmospheric gases within the plant from small leaks and gas seals. Quantities of fluorine and hydrogen fluoride are formed as reaction products of process gas with the metal surfaces of the plant and with moisture which may leak into the plant. Leaks sometimes develop in the cascade which admit moist air or coolant material such as perfluorodimethylcyclohexane to the gaseous mixture within the plant. In order to remove such foreign gases from the plant, purge means are incorporated in the plant, which means are designed to selectively remove the uranium hexafluoride from the foreign gases. Such means include diffusion separation means separate from the main plant or diffusion cascade, condensation means for separating the condensable from the non-condensable gases, and absorption means for separating the absorbable from the non-absorbable material.

An absorbent for uranium hexafluoride enriched with respect to U$^{235}$ should posses certain other properties. It must possess reproduceable absorption capacity for uranium hexafluoride since safety considerations demand that a fixed maximum concentration of enriched uranium in one spot should not be exceeded because of the possibility of an atomic explosion. The fixed maximum concentration of enriched uranium allowable depends on the extent of enrichment. For higher concentrations of the U$^{235}$ isotope a smaller quantity may be collected in a single container.

Since fluorine and hydrogen fluoride are likely to be components of the gaseous mixture, along with uranium hexafluoride, the absorbent must be resistant to the corrosive action of these gases. The rate of absorption of uranium hexafluoride should be sufficiently rapid to effect the absorption of substantially all of the uranium hexafluoride from a gaseous mixture by contacting said gaseouus mixture with said absorbent for a relatively short time.

Most previously disclosed absorbents for uranium hexafluoride are solids and methods of employing these absorbents for recovering uranium hexafluoride from gaseous mixtures are necessarily limited by the properties inherent to solid absorbents. Such limitations as immobility and inadaptability to continuous processing are characteristic of solid absorbents. Processes employing previously disclosed liquid phase absorbents suffer from the disadvantage of uncontrolled precipitation in the process apparatus, said precipitation leading to undesirable accumulation of the precipitate in apparatus conduits or absorption columns. Such deposits cause plugging of the apparatus, or partial plugging which decreases the efficiency of the apparatus. In addition, when the absorbed uranium hexafluoride is appreciably enriched with respect to its lighter isotope, U$^{235}$, the uncontrolled precipitation and accumulation of quantities of solid products in the absorption apparatus may lead to the development of a mass of volume relation of U$^{235}$ in excess of the critical value. The possibility of atomic explosion resulting from such development prohibits the use of absorbents which cause such uncontrolled precipitations or makes methods of use such as will avoid such developments so cumbersome as to decrease the efficiency of the absorption process.

It is an object of the present invention to provide an improved method of recovering uranium hexafluoride from gaseous mixtures.

It is another object of the present invention to provide a method of recovering UF$_6$ from gaseous mixtures which may be adapted to be used as a continuous process.

It is a further object of the present invention to provide a method of recovering UF$_6$ from gaseous mixtures wherein uncontrolled deposition of uranium compounds in processing equipment is substantially prevented.

Other objects of the invention will be in part obvious and in part pointed out hereafter.

The objects of the present invention are achieved by absorbing $UF_6$ in a liquid composition at least one component of which is an alkamine having less than three carbon atoms bonded to the amino-nitrogen of said alkamine, less than two of the non-amino carbon atoms of said alkamine being free of the hydroxy radical. Non-amino carbon atoms are defined as those which are not bonded directly to the amino-nitrogen for the purposes of the present invention. Absorbed $UF_6$ has been found not to precipitate uncontrollably from compositions of this class though it may be precipitated as desired by addition of suitable precipitating agents.

One compound which has been found particularly suitable as an absorbent of uranium hexafluoride is ethanolamine and the present invention will, therefore, be described with reference to this compound. It will be understood, however, that the present invention may be practiced with many other compounds of the group indicated above, and the embodiment of the invention is herewith described with reference to ethanolamine for illustrative purposes only. Ethanolamine absorbs about 40 percent by weight of uranium hexafluoride before it is spent. The viscosity of the absorbent increases rapidly as it absorbs the uranium hexafluoride, and it is accordingly preferred to limit the quantity of uranium hexafluoride absorbed to values which do not cause the absorbent to become sufficiently viscous to hinder its flow through the absorption apparatus.

As an alternative to restricting the amount of $UF_6$ absorbed, diluents may be added to the absorbent to prevent the development of excessive viscosity. For example, 10% by volume of water may be added to the absorbent without affecting its absorptive properties, but the addition of water does materially lessen the viscosity of the absorbent containing $UF_6$.

Other diluents may be added to the ethanolamine in greater quantities to make the process more economical, although the viscosity of the resulting solution is not improved because of the addition of such diluents. Thus ethanolamine may be diluted with 50% by volume of ethylene glycol and still absorb 20 percent by weight of uranium hexafluoride, but without appreciable difference in the viscosity of the resulting solution from that resulting from absorption of 20 percent by weight of $UF_6$ in the pure ethanolamine absorbent.

When a desired quantity of uranium hexafluoride has been absorbed, it may be precipitated by the addition of any one or combination of suitable precipitating agents. For example, the addition of water in excess of 10 percent by volume causes precipitation of a brown solid. The quantity of water, in excess of 10 percent by volume, necessary to cause the complete precipitation of the absorbed uranium hexafluoride varies in relation to the quantity of uranium hexafluoride absorbed, more water being required in general for absorbents having a higher concentration of uranium hexafluoride. Analysis indicates the precipitate formed by the addition of water in excess of 10 percent by volume to be uranous hydroxide. Other precipitating agents include solutions of alkali hydroxides and in general other compositions which cause the precipitation of solids on reactions with $UF_6$ in the absorbed state.

Stainless steel has been found to be highly resistant to the corrosive action of the absorbent and to mixtures of the absorbent and absorbate and for this reason it is preferred to use a corrosion resistant metal such as stainless steel in absorption equipment when employing ethanolamine as an absorbent, Approximately 140 kilocalories per mole of heat are evolved in the reaction of uranium hexafluoride with ethanolamine. It is, therefore, advisable to include cooling means in the absorption apparatus because of this relatively large amount of heat developed during absorption. Carrying out the absorption at temperatures in the order of 60°C. is favorable to the low viscosity of the absorbent which is desirable in the efficient operation of the present invention. The removal of uranium hexafluoride from the absorbent should be carried out within a relatively short time after absorption because more concentrated solutions of uranium hexafluoride in ethanolamine have been found on standing to turn to a very viscous brown composition. One of the most stable absorbent-absorbate compositions is a mixture by volume of 5 percent water and 95 percent ethanolamine in which 15 percent by weight $UF_6$ had been absorbed and the employment of such an absorption procedure as will result in absorbing about 15 percent by weight in such an absorbent is preferred where stability of solution is desired.

It will be apparent from the foregoing that the present invention provides an effective method for recovering uranium hexafluoride from gaseous mixtures, such as those exhausted from a gaseous diffusion plant. Among the preferred compounds which are to be included in the group suitable for use in accordance with the present invention are included alkamines having the general formula:

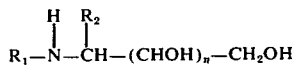

wherein:

$R_1$ stands for a member of the group consisting of H, $CH_3$, and $CH_2 — (CHOH)_n — CH_2OH$, and $R_2$ stands for a member of the group consisting of H and $CH_3$.

Such compounds for example, as diethanolamine and 3-methyl-3-amino-propane-diol- 1,2 are members of this group. Other alkamines, not within this class, have been found unsuitable for use according to the method of the present invention because uncontrollable precipitation of the absorbate occurs.

As pointed out above, ethanolamine has been found particularly suitable for use in accordance with the present invention. The invention may be adapted readily to a continuous process utilizing an apparatus having absorption and recovery zones. According to one such process, the absorbent is introduced into and passed through the absorbing zone. The gaseous mixture containing uranium hexafluoride is passed through the absorption zone preferably countercurrent to the absorbent. The absorbent is then flowed to the recovery zone. The absorbent which has been separated from the uranium precipitation products is cooled and returned to the absorbing zone, and thus recycled. Although an appreciable quantity of the absorbent is consumed in this process, when the quantity of uranium hexafluoride absorbed therein is relatively small, the recycling of the unused portion to effect a continuous processing as described above becomes relatively important. Other alternatives will be obvious to those familar with the art.

I claim:

1. A method of recoverying $UF_6$ from gaseous mixtures which comprises absorbing said $UF_6$ in a liquid composition at least one of the components of which is an alkamine having less than three carbon atoms bonded to the same amino-nitrogen thereof, less than two of the carbon atoms other than those bonded to the amino nitrogen of said alkamine being free of the hydroxy radical.

2. A method of recovering $UF_6$ from gaseous mixtures which comprises absorbing said $UF_6$ in a liquid composition of relatively low viscosity at least one of the components of which is an alkamine having less than three carbon atoms bonded to the amino-nitrogen thereof, less than two of the carbon atoms other than those bonded to the amino nitrogen of said alkamine being free of the hydroxy radical.

3. A method of recoverying $UF_6$ from gaseous mixtures which comprises absorbing said $UF_6$ in a liquid composition at least one component of which is an alkamine having less than three carbon atoms bonded to the amino-nitrogen thereof, less than two of the carbon atoms other than those bonded to the amino nitrogen of said alkamine being free of the hydroxy radical and thereafter precipitating the absorbed uranium therefrom.

4. A method of recovering $UF_6$ from gaseous mixtures which comprises absorbing said $UF_6$ in a liquid composition of relatively low viscosity at least one component of which is an alkamine having less than three carbon atoms bonded to the amino nitrogen thereof, less than two of the carbon atoms other than those boded to the amino nitrogen of said alkamine being free of the hydroxy radical and thereafter precipitating the absorbed uranium therefrom.

5. A method of recovering $UF_6$ from gaseous mixtures which comprises absorbing said $UF_6$ in an liquid alkamine having less than three carbon atoms bonded to the amino-nitrogen thereof, less than two of the carbon atoms other than those bonded to the amino nitrogen of said alkamine being free of the hydroxy radical and thereafter precipitating the absorbed uranium therefrom.

6. A method of recovering $UF_6$ from gaseous mixtures which comprises absorbing said $UF_6$ in a composition at least one component of which is ethanolamine and thereafter precipitating the absorbed uranium therefrom.

7. A method of recovering $UF_6$ from gaseous mixtures which comprises absorbing less than 40% by weight of $UF_6$ in ethanolamine and thereafter precipitating the absorbed uranium therefrom by the addition of a suitable precipitating agent.

8. A method of recovering $UF_6$ from gaseous mixtures which comprises absorbing less than 40% by weight of $UF_6$ in ethanolamine and thereafter precipitating the absorbed uranium therefrom by addition of more than 10% by volume of water.

9. A method of recovering $UF_6$ from gaseous mixtures which comprises absorbing less than 15 percent by weight of $UF_6$ in a composition of 5 percent by volume of water and 95 percent by volume of ethanolamine, and thereafter precipitating the absorbed uranium therefrom by the addition of a suitable precipitating agent at a desired time after absorption.

10. A method of recovering $UF_6$ from gaseous mixtures which comprises absorbing said $UF_6$ in a liquid composition at least one of the components of which is chosen from the group consisting of ethanolamine, diethanolamine, and 3-methyl-3-amino-propane-diol-1,2.

* * * * *